United States Patent
Demartini et al.

(10) Patent No.: US 12,232,512 B2
(45) Date of Patent: Feb. 25, 2025

(54) METHODS FOR IMPROVING THE AMINO ACID CONTENT OF ANIMAL FEED PRODUCTS

(71) Applicant: DANISCO US INC, Palo Alto, CA (US)

(72) Inventors: Jaclyn Diana Demartini, Palo Alto, CA (US); Bradley R. Kelemen, Palo Alto, CA (US); Michael J. Pepsin, Palo Alto, CA (US)

(73) Assignee: DANISCO US INC., Palo Alto, CA (US)

( * ) Notice: Subject to any disclaimer, the term of this patent is extended or adjusted under 35 U.S.C. 154(b) by 465 days.

(21) Appl. No.: 17/615,130

(22) PCT Filed: Jun. 5, 2020

(86) PCT No.: PCT/US2020/036444
§ 371 (c)(1),
(2) Date: Nov. 30, 2021

(87) PCT Pub. No.: WO2020/247834
PCT Pub. Date: Dec. 10, 2020

(65) Prior Publication Data
US 2022/0232855 A1    Jul. 28, 2022

Related U.S. Application Data

(60) Provisional application No. 62/857,624, filed on Jun. 5, 2019.

(51) Int. Cl.
*A23K 10/14*   (2016.01)
*A23K 10/38*   (2016.01)

(52) U.S. Cl.
CPC .............. *A23K 10/14* (2016.05); *A23K 10/38* (2016.05)

(58) Field of Classification Search
CPC ........ A23K 10/14; A23K 10/38; A23K 10/12; A23K 10/30; A23K 20/105; A23K 20/163; Y02E 50/10; Y02P 60/87; C12Y 101/03004; C12Y 111/01006; C12Y 101/03005; B01D 3/001; C12R 2001/87; A23L 29/065; A23L 29/06; A23L 7/104; A23L 7/101; A23L 29/35; A23L 33/14; A23L 33/175; A23L 33/135; A23L 7/107; A23L 7/25; A23L 33/17; A23L 31/00; A23L 31/10; A23L 5/25; A23L 3/3571; A23V 2250/76; A23V 2250/762; A23V 2250/61; A23V 2250/06; A23V 2250/063; A23V 2250/0632; A23B 5/16; C12P 7/06; A23C 19/061; A23C 19/063
USPC ........ 426/10, 18, 19, 20, 21, 23, 27, 28, 31, 426/60, 656, 661, 623, 624, 52, 53, 49, 426/54
See application file for complete search history.

(56) References Cited

U.S. PATENT DOCUMENTS

| | | | |
|---|---|---|---|
| 3,249,512 A * | 5/1966 | Bode ................ | C13K 1/06 426/18 |
| 4,377,602 A * | 3/1983 | Conrad .............. | C13K 1/06 426/656 |
| 5,061,497 A * | 10/1991 | Thacker ............ | C12P 7/06 426/605 |
| 5,080,917 A * | 1/1992 | Itoh .................. | A61K 9/5047 426/74 |
| 5,106,634 A * | 4/1992 | Thacker ............ | C12P 7/06 426/31 |
| 5,316,782 A * | 5/1994 | Zimlich, III ....... | A23K 10/38 426/456 |
| 5,439,701 A * | 8/1995 | Zimlich, III ....... | A23L 27/201 426/624 |
| 6,924,366 B2 * | 8/2005 | Stougaard .......... | A23K 30/18 435/69.7 |
| 7,745,599 B1 * | 6/2010 | Stougaard .......... | C12P 21/02 435/254.2 |
| 7,919,289 B2 * | 4/2011 | Lewis ............... | C12P 19/14 435/254.2 |
| 9,040,278 B2 * | 5/2015 | Cascao-Pereira ... | C12P 19/02 435/162 |
| 9,040,279 B2 * | 5/2015 | Breneman .......... | C12P 7/00 435/162 |
| 2003/0180416 A1 * | 9/2003 | Schneider ......... | C12N 9/0006 435/189 |
| 2004/0009262 A1 * | 1/2004 | Chukwu ............ | A23L 7/107 426/52 |
| 2005/0233030 A1 * | 10/2005 | Lewis ............... | C12C 12/00 426/49 |
| 2005/0266543 A1 * | 12/2005 | Dunn-Coleman ... | C12N 9/242 435/204 |
| 2007/0243235 A1 * | 10/2007 | David ............... | A23K 10/18 435/69.1 |
| 2008/0026101 A1 * | 1/2008 | Nickel .............. | A23K 50/10 426/549 |

(Continued)

FOREIGN PATENT DOCUMENTS

| | | | | | |
|---|---|---|---|---|---|
| CN | 102405283 A | * | 4/2012 | ............ | C12N 9/16 |
| EP | 2281898 A1 | * | 2/2011 | ............ | A23L 7/104 |

(Continued)

OTHER PUBLICATIONS

International Search Report and Written Opinion for PCT App. No. PCT/US2020/036444 dated Oct. 13, 2020, 8 pages.

(Continued)

*Primary Examiner* — Drew E Becker
*Assistant Examiner* — Luis Eugenio Diou Berdecia

(57) ABSTRACT

Disclosed are compositions and methods for improving the amino acid content of animal feed byproducts from a dry grind ethanol production facility by reducing the amount of residual reducing sugars that can participate in, e.g., the Maillard reaction. The compositions and methods provided herein for improving the amino acid content of animal feed include enzymes capable of oxidizing the residual sugars.

13 Claims, No Drawings

(56) References Cited

U.S. PATENT DOCUMENTS

| | | | |
|---|---|---|---|
| 2009/0011108 A1* | 1/2009 | Kogiso | A23L 33/10 426/573 |
| 2010/0112124 A1* | 5/2010 | Streekstra | A23L 19/18 426/50 |
| 2010/0124583 A1* | 5/2010 | Medoff | C12P 13/14 536/56 |
| 2011/0033575 A1* | 2/2011 | Kragh | A23L 29/35 426/549 |
| 2011/0223284 A1* | 9/2011 | David | C12P 7/16 435/114 |
| 2012/0156329 A1* | 6/2012 | Baldwin | C12P 19/24 426/48 |
| 2012/0244252 A1* | 9/2012 | Soe | A23C 19/0912 426/531 |
| 2013/0209607 A1* | 8/2013 | Rittig | A21D 2/26 426/18 |
| 2013/0224800 A1* | 8/2013 | Callen | C12P 19/14 162/158 |
| 2013/0269061 A1* | 10/2013 | Lessard | C12N 9/1294 435/150 |
| 2013/0280774 A1* | 10/2013 | Blake | C12P 7/46 435/166 |
| 2013/0309360 A1* | 11/2013 | Lewis | A23L 7/104 426/64 |
| 2014/0199705 A1* | 7/2014 | Steer | A61K 9/0056 435/165 |
| 2014/0212543 A1* | 7/2014 | Lywood | C12P 7/08 426/624 |
| 2014/0223602 A1* | 8/2014 | Chang | C12N 9/2437 435/254.2 |
| 2014/0295025 A1* | 10/2014 | Bouvet | A21D 13/36 426/28 |
| 2014/0322762 A1* | 10/2014 | Vehmaanpera | C12N 9/96 435/254.6 |
| 2014/0328975 A1* | 11/2014 | Schaffer-Lequart | A23L 33/21 426/18 |
| 2015/0044356 A1* | 2/2015 | Bootsma | C12P 7/6434 426/531 |
| 2015/0150282 A1* | 6/2015 | Arent | A23K 10/38 426/18 |
| 2015/0152457 A1* | 6/2015 | Blake | C12P 19/12 435/43 |
| 2015/0218606 A1* | 8/2015 | van Brussel-Zwijnen | C12Y 302/01041 510/320 |
| 2015/0240223 A1* | 8/2015 | Hua | D06M 16/003 435/126 |
| 2015/0351433 A1* | 12/2015 | Arent | A23L 33/21 426/18 |
| 2016/0002609 A1* | 1/2016 | Bocola | C12N 9/0006 435/14 |
| 2016/0010129 A1* | 1/2016 | Cuevas | C12N 9/2417 435/162 |
| 2016/0021896 A1* | 1/2016 | De Boer | C12N 9/18 426/549 |
| 2016/0082022 A1* | 3/2016 | Medoff | A61K 31/7016 514/23 |
| 2016/0135472 A1* | 5/2016 | Bellido | A21D 8/042 426/549 |
| 2016/0242446 A1* | 8/2016 | Groenewold | A23K 20/142 |
| 2016/0333332 A1* | 11/2016 | Teunissen | C12P 19/14 |

FOREIGN PATENT DOCUMENTS

| | | | | |
|---|---|---|---|---|
| JP | 2009183209 A | * | 8/2009 | |
| JP | 2016174612 A | * | 10/2016 | C12N 1/14 |
| WO | 02/39828 A2 | | 5/2002 | |
| WO | WO2002039828 A2 | * | 5/2002 | C12Y 101/03004 |
| WO | WO-2004039174 A2 | * | 5/2004 | A21D 8/042 |
| WO | WO-2017223068 A1 | * | 12/2017 | A23K 10/38 |
| WO | WO-2018112376 A1 | * | 6/2018 | C12N 9/2402 |

OTHER PUBLICATIONS

Almeida et al., "Amino acid digestibility of heat damaged distillers dried grains with solubles fed to pigs", Journal of Animal Science and Biotechnology, vol. 4, No. 1, Nov. 14, 2013, pp. 44-53.

Maillard, "Action of Amino Acids on Sugars. Formation of Melanoidins in a Methodical Way", Compt. Rend, 154, 1912, pp. 66-68.

Qiao, "Routine techniques for monitoring the nutritional value of animal meals", Dissertation, North Carolina State University, 2001, 224 pages.

* cited by examiner

METHODS FOR IMPROVING THE AMINO ACID CONTENT OF ANIMAL FEED PRODUCTS

CROSS-REFERENCE TO RELATED APPLICATION

This application is a U.S. national stage application under 35 U.S.C. § 371 of International Application No. PCT/US2020/036444, filed on Jun. 5, 2020, entitled "METHODS FOR IMPROVING THE AMINO ACID CONTENT OF ANIMAL FEED PRODUCTS," which claims priority to U.S. Provisional Patent Application No. 62/857,624 filed Jun. 5, 2019, the disclosure of which is incorporated by reference herein in its entirety.

TECHNICAL FIELD

Disclosed are compositions and methods for improving the amino acid content of animal feed byproducts from an ethanol production facility by reducing the amount of residual reducing sugars that can participate in the Maillard and other reactions.

BACKGROUND

A 56-pound bushel of corn processed in a dry mill ethanol plant traditionally generates about 2.8 gallons of ethanol and 17.5 pounds of animal feed. Animal feed is in the form of distillers dried grains with solute (DDGS) and represents the starch-depleted portion of corn plus the biomass of the yeast used for fermentation. Per weight, DDGS is more nutritional for animals than the unprocessed corn because it is richer in protein and fat. Beyond DDGS, dry mill ethanol plants also have the ability to create other protein-rich corn co-products for animal feed applications.

Unfortunately, not all amino acids withstand the ethanol production process equally well. Lysine, in particular, is significantly degraded via the Maillard reaction during the DDGS and corn co-product drying step. Lysine is an essential amino acid for animals; therefore, if it cannot be provided by DDGS or other corn co-product, it must be supplemented. In fact, a significant cost of animal feed is free-amino-acid lysine.

The need exists to reduce the amount of lysine degradation in the preparation of DDGS or other corn co-products to reduce the need for subsequent lysine supplementation.

SUMMARY

The present compositions and methods relate to improving the amino acid content of by-products from an ethanol production facility by reducing the amount of residual reducing sugars that can participate in, e.g., the Maillard reaction. The compositions and methods are particularly valuable for the preparation of animal feed product. Aspects and embodiments of the compositions and methods are summarized in the following separately-numbered paragraphs:

1. In one aspect, a method for reducing the degradation of amino acids in a dried post-fermentation product from a dry-grind ethanol production facility is provided, comprising contacting a wet post-fermentation product comprising residual reducing sugars and amino acids with an enzyme capable of oxidizing the residual sugars, thereby reducing degradation of the amino acids via the Maillard reaction during a subsequent heating step to produce a heat-applied post-fermentation product.
2. In some embodiments of the method of claim 1, the wet post-fermentation product is fermentation broth.
3. In some embodiments of the method of claim 1, the wet post-fermentation product is whole stillage.
4. In some embodiments of the method of claim 1, the wet post-fermentation product is thin stillage.
5. In some embodiments of the method of any of claims 1-4, the heat-applied post-fermentation product is distillers dried grains, distillers dried grains with solutes, condensed distillers solubles or other protein-containing coproducts.
6. In some embodiments of the method of any of claims 1-5, the free amino acids are present in a starch-containing substrate used to produce a mash.
7. In some embodiments of the method of claim 6, the substrate comprises corn.
8. In some embodiments of the method of any of claims 1-6, the free amino acids are produced by a fermenting organism used to produce a fermentation broth.
9. In some embodiments of the method of claim 8, the fermenting organism is yeast.
10. In some embodiments of the method of any of claims 1-9, the amino acids are lysines.
11. In some embodiments of the method of any of claims 1-10, the enzyme capable of oxidizing the residual sugars is glucose oxidase and/or hexose oxidase.
12. In some embodiments of the method of any of claims 1-11, the reducing sugars comprise glucose.
13. In some embodiments, the method of any of claims 1-12, further comprise contacting the wet post-distillation product comprising residual sugars and amino acids with catalase.
14. In some embodiments of the method of claim 13, the amino acids are lysines and methionines.

These and other aspects and embodiments of the compositions and methods will be apparent from the present description.

DETAILED DESCRIPTION

1. Definitions and Abbreviations

Prior to describing the various aspects and embodiments of the present compositions and methods, the following definitions and abbreviations are described.

In accordance with this detailed description, the following abbreviations and definitions apply. Note that the singular forms "a," "an," and "the" include plural referents unless the context clearly dictates otherwise. Thus, for example, reference to "an enzyme" includes a plurality of such enzymes, and reference to "the dosage" includes reference to one or more dosages and equivalents thereof known to those skilled in the art, and so forth.

The present document is organized into a number of sections for ease of reading; however, the reader will appreciate that statements made in one section may apply to other sections. In this manner, the headings used for different sections of the disclosure should not be construed as limiting.

Unless defined otherwise, all technical and scientific terms used herein have the same meaning as commonly understood by one of ordinary skill in the art. The following terms are defined, below, for clarity.

As used herein. "whole stillage" is the byproduct of a dry-grind ethanol production facility following distillation.

As used herein, "thin stillage" is the liquid portion of whole stillage following separation of solid materials.

As used herein, "distillers' grains (DG)" is the solid/slurry component of whole stillage.

As used herein, "distillers' dried grains (DDG) is DG that have been dried.

As used herein, "distillers' dried grains with solutes (DDGS) is DG that has been dried along with the concentrated thin stillage for added nutritional value.

As used herein, a "wet" by-product of distillation contains at least 20% water by weight.

As used herein, a "dried" by-product of distillation contains less than 20% water by weight.

As used herein, the term "amino acid" refers to both a free amino acid and amino acid residue incorporated into a protein.

As used herein, the term "amino acid degradation" refers to chemical alteration of an amino acid by the Maillard reaction, optionally in combination with other reactions.

As used here, the term "contacting" refers to bringing a plurality of components into physical proximity, e.g., to facility a chemical reaction.

As used herein, The term "about" refers to ±15% to the referenced value.

The following abbreviations/acronyms have the following meanings unless otherwise specified: [WILL BE USED AS NEEDED]

EC Enzyme Commission
° C. degrees Centigrade
$H_2O$ water
$dH_2O$ or DI deionized water
$dIH_2O$ deionized water, Milli-Q filtration
g or gm grams
μg micrograms
mg milligrams
kg kilograms
μL and μl microliters
mL and ml milliliters
M molar
mM millimolar
μM micromolar
U units
min minute
rpm revolutions per minute
hr hour
CAZy Carbohydrate-Active Enzymes database
HOx hexose oxidase
GOx glucose oxidase
DG distillers' grains
DDG distillers' dried grains
DDGS distillers' dried grains with solutes

2. Degradation of Amino Acids in Animal Feed Products

The Maillard reaction (Maillard, L. C. (1912). *Compt. Rend.* 154:66) is a chemical reaction between amino acids and reducing sugars that occurs at temperatures between about 140 to 165° C. The reaction is best known for giving browned foods their distinctive flavor, including, for example, seared steaks, pan-fried dumplings, biscuits, breads, toasted marshmallows, and the like. The reaction destroys amino acids, whether in the form of free amino acids or amino acid residues in proteins.

A valuable, and sometimes overlooked, by-product of dry-grind ethanol fermentation is animal feed, usually in the forms of distillers' dried grains (DDG) or, more commonly, distillers' dried grains with solutes (DDGS). For simplicity, these products are collectively referred to as "DDGS," which is the most common product, unless context indicates otherwise. Such animal feed products are in many ways more nutritional than the initial feed-stocks used for ethanol production as they are depleted for carbohydrates but enriched for amino acids derived both from the feed-stock and the fermenting organism (i.e., ethanologen).

The specific amino acid composition of DDGS or other corn co-product is important to the quality of animal feed. Some amino acids are far more important than others. For example, lysine is an essential amino acid for most farm animals and, if it cannot be provided by DDGS, must be supplemented to maximize feed conversion. Synthetic lysine is expensive and represents a significant cost of animal feed. Methods for increasing the content of lysine in DDGS or other corn co-products are highly desirable and should allow ethanol producers to extract more value from their products.

The present compositions and methods relate to the addition of enzymes to wet, post-fermentation products from an ethanol production facility to oxidize residual reducing sugars, particularly residual glucose, for the purpose of preventing the loss of amino acids, particularly lysine, to Maillard reactions during a subsequent drying step. A variation of the present compositions and methods includes the further use of catalase to reduce the oxidation of methionine, providing additional value to DDGS or other corn co-products.

3. Oxidizing Residual Reducing Sugars in Post-Fermentation by-Products

A reducing sugar is a sugar capable of acting as a reducing agent by virtue of possessing a free aldehyde group, in the case of aldoses, or a ketone group, in the case of ketoses. All naturally-occurring monosaccharides are reducing sugars, along with some disaccharides, oligosaccharides, and polysaccharides. Examples of reducing sugars include glucose, lactose, maltose and cellobiose, but not sucrose or trehalose. The reducing sugar most prevalent in wet-post-fermentation products from an ethanol production facility (whether from a starch-based substrate or from a cellulase based substrate) is glucose, although small amounts of other reducing sugars are present.

Enzymes for use according the present compositions and methods oxidize residual reducing sugars, thereby reducing the destruction of amino acids via, e.g., the Maillard reaction in a subsequent drying step. Exemplary enzymes include hexose oxidases (HOx; EC 1.1.3.5), which have broad specificity toward hexoses, and glucose oxidases (GOx; EC 1.1.3.4), which are specific for glucose. HOx is available as GRINDAMYL® SUREBAKE™ 800 (DuPont). GOx is sold under the brand names OPTIMASE® GO, GRINDAMYL® S 758 and FOODPRO® GOL (DuPont), GLUZYMIE® MONO™ 10.000 BG (Novozymes) BAKEZYME® Go Pure (DSM) and ALPHAMALT® GLOXY™ 5080 (Muhlenchemie). GOx from *Aspergillus niger* is also available from Sigma-Aldrich.

In the application, HOx or GOx are preferably added at about 0.0625% volume/dry weight fermentation residual to result in 0.01%-1.25% mass HOx or GOx/dry weight ferm residual. The amount of HOx or GOx required can be determined by incrementally adjusting the amount used and measuring the amount of lysine recovered.

4. Further Addition of Catalase to Reduce Methionine Oxidation

While a primary advantage of the present compositions and methods is to reduce the destruction of lysine via, e.g., the Maillard reaction, a potential disadvantage is the loss of methionine due to oxidation. This disadvantage can be avoided by the further inclusion of catalase with the wet, post-distillation product. Catalases (EC 1.11.1.6) destroy free hydrogen peroxide produced by the oxidation of reducing sugars to products that no longer participate in the Maillard reaction, thereby eliminating unwanted knock-on effects from the addition of such enzymes as glucose oxidase or hexose oxidase.

Catalase is sold under the brand names OPTIMASE® CA 800L, FOODPRO® CAT, OXY GONE® T400 (DuPont) and CATAZYME® 25 (Novozymes).

In the application, catalase is added at about 1:1 mass % with respect to HOx or GOx. As with HOx or GOx, the amount required can be determined by incrementally adjusting the amount used and, in this case, measuring the amount of methionine recovered.

5. Tuning of the Addition of Enzymes to Post-Fermentation by-Products

According to the present compositions and methods, the afore-mentioned enzyme(s) is contacted with a wet, post-distillation product, such as end of fermentation broth, whole stillage or thin stillage. In some cases, the enzyme is added to whole stillage and the final product is either DDG or DDGS. In other cases, the enzyme is added to thin stillage, which is then combined with DDG to produce DDGS. While these represent the most practical methods of practicing the present compositions and methods, others exist and are encompassed by the present description, including the applications of enzyme to partially-dried DDG/DDGS or other corn co-products.

6. Variations on the Dry Grind Process

Numerous variations of the dry grind ethanol production process exist, including cold cook, or no cook, involving liquefaction at or below the gelatinization temperature, simultaneous saccharification and fermentation, fractionation processes, and the like. While such variations may alter the residual amount of reducing sugars and amino acids in wet post-distillation products, none are expected to be incompatible with the present compositions and methods.

7. Compatible Starch Substrates

Starch substrates for use in producing wet post-fermentation products are not limited to corn, but may also include, e.g., tubers, roots, stems, legumes, cereals or whole grain. More specifically, starch substrate may be obtained from con, cobs, wheat, barley, rye, triticale, milo, sago, millet, cassava, tapioca, sorghum, rice, peas, bean, banana, or potatoes.

8. Additional Enzymes

The present compositions and methods involving oxidoreductases that catalyses the oxidation of glucose are in no way intended to exclude the use of other enzymes. In fact, it should be understood that enzymes that hydrolyze of starch, such as α-amylases and glucoamylases, remain important for the dry grind process that generates the described wet post-fermentation products. Additional enzymes that are advantageous to include in the dry grind process include but are not limited to phytase, protease, pullulanase, β-amylase, isoamylase, α-glucosidase, cellulase, xylanase, other hemicellulases, β-glucosidase, transferase, pectinase, lipase, cutinase, esterase, mannanases, redox enzymes, a different α-amylase, or a combination thereof.

9. Fermenting Organisms

The present compositions and methods do not require a particular fermenting organism. Typical fermenting organisms are yeast. Yeasts are unicellular eukaryotic microorganisms classified as members of the fungus kingdom and include organisms from the phyla Ascomycota and Basidiomycota. Yeast that can be used for alcohol production include, but are not limited to, *Saccharomyces* spp., including *S. cerevisiae*, as well as *Kluyveromyces*, *Lachancea* and *Schizosaccharomyces* spp. Numerous yeast strains are commercially available, many of which have been selected or genetically engineered for desired characteristics, such as high alcohol production, rapid growth rate, and the like. Some yeasts have been genetically engineered to produce heterologous enzymes, such as glucoamylase or α-amylase.

All references cited herein are herein incorporated by reference in their entirety for all purposes. In order to further illustrate the compositions and methods, and advantages thereof, the following specific examples are given with the understanding that they are illustrative rather than limiting.

EXAMPLES

Example 1: Post-Fermentation Treatment Using HOx and HOx+Catalase

Liquefact (corn mash slurry) was prepared by adding 600 ppm of urea, 0.124 SAPU/g ds acid fungal protease, 0.33 GAU/g ds variant *Trichoderma reesei* glucoamylase and 1.46 SSCU/g ds *Aspergillus kawachii* α-amylase, adjusted to a pH of 4.8 with sulfuric acid. Simultaneous saccharification and fermentation were performed using standard procedures and conventional yeast.

At the end of SSF (66 hours), HOx alone, or HOx along with catalase (HOx+catalase) was added to flasks in duplicate, while two control flasks had no enzyme added. HOx (pre-commercial sample) was added at 1% w/w with respect to the wet weight of corn liquefact (i.e., 10 mg HOx per gram) and catalase (OPTIMASE® CA) was added at 0.075% v/w (i.e., 75 μL catalase per gram). Following enzyme addition, flasks were placed back in the incubator at the same SSF conditions (32° C. with shaking at 200 rpm) and allowed to incubate for a further 4 hours. After 4 hours, the fermentation broth from duplicate flasks was collected in 800 mL beakers and placed into a shaking water bath at 90° C. to evaporate off the ethanol. The fermentation broth was allowed to incubate for approximately 3-5 hours, or until no significant ethanol was detected by HPLC. Some water was also lost during this process. The resulting material (i.e., whole stillage) was spun down at 6,000 rpm for 10 min. The supernatant (i.e., thin stillage) and precipitate (i.e., wet cake) were both collected. Wet cake was dried at 37° C. until reaching a dry solids content of about 34%. Thin stillage was weighed into 600 mL beakers and put in a shaking water bath at 97° C. to concentrate the contents by about 4.8-fold (by weight) to create syrup. To make DDGS samples, wet cake and the corresponding syrup were combined at a 2-to-1 mass ratio (as-is weights) and mixed well. DDGS was spread onto a metal tray and dried in a 99° C. oven for about 3 hours, with occasional mixing to >90% dry solids content.

To test for bioavailable amino acids, samples of DDGS were incubated with pepsin and pancreatin, based on a previously reported method (Qiao Y (2001) *Routine techniques for monitoring the nutritional value of animal meals*, Doctoral thesis at North Carolina State University). Briefly, 0.33 g of DDGS was added to a 20 mL scintillation vial along with 3.33 mL of 0.05 M citrate buffer (pH 2) and approximately 0.012 g pepsin (from porcine gastric mucosa) at ≥400 units/mg protein. The mixture was allowed to incubate at 38° C. for about 24 hours with shaking at 200 rpm. After this time, 5 mL of phosphate buffer (0.2 M, pH 11.5, with 0.025% w/w sodium azide) and approximately 0.023 g pancreatin (from porcine pancreas, 4×UXP specifications) was added to each vial. The vials were placed back into the 38° C. incubator shaking with at 200 rpm for around 66 hours. After this time, samples were taken from each vial, spun down through a 0.2 ρM filter and analyzed by HPLC for free amino acids.

The results shown in Table 1 compare the measured bioavailable amino acid concentration from HOx and HOx+catalase-treated DDGS to the control DDGS (non enzyme treated). The HOx-treated sample showed a 10% increase in bioavailable lysine, while the HOx+catalase sample showed a 25% increase in bioavailable lysine. The HOx-treated sample showed a significant loss of methionine versus the control, presumably due to the production of hydrogen peroxide by HOx. The inclusion of catalase prevented this loss, resulting in 17% more bioavailable methionine compared to the control.

TABLE 1

Bioavailable amino acids in enzyme-treated DDGS

| Amino acid | Treatment | |
| --- | --- | --- |
| | HOx | HOx + catalase |
| Asp | 1.075 | 1.085 |
| Glu | 1.017 | 1.031 |
| Ser | 0.998 | 1.003 |
| His | 1.022 | 0.902 |
| Gly | 1.144 | 1.193 |
| Thr | 0.924 | 0.974 |
| Arg | 1.031 | 1.008 |
| Ala | 0.990 | 0.998 |
| Tyr | 0.988 | 0.999 |
| Cys | 0.995 | 0.892 |
| Val | 0.948 | 0.992 |
| Met | 0.024 | 1.168 |
| Phe | 0.998 | 1.011 |
| Ile | 0.946 | 0.987 |
| Leu | 1.027 | 1.017 |
| Lys | 1.099 | 1.254 |
| Pro | 1.001 | 1.044 |

Example 2: Post-Fermentation Treatment Using GOx and GOx+Catalase

Whole stillage from a dry grind ethanol plant was collected and treated with either GOx or GOx+catalase. Specifically, GOx (OPTIMASE® GO) was added at 0.0125% v/w, and catalase (FOODPROC CAT) was added at 0.0125% v/w, with respect the wet weight of stillage. After enzyme addition, flasks containing the whole stillage (200 g) and added glucose (final concentration of about 0.46 g/L) were placed into an incubator at 32° C. with shaking at 200 rpm, and allowed to incubate for 3 hours. A control flask with no enzyme addition (with glucose at a final concentration of about 0.46 g/L) was also included in testing. After 3 hours, the whole stillage samples were collected and spun down at 6,000 rpm for 10 minutes. The supernatant (thin stillage) and precipitate (wet cake) were collected. Wet cake was dried at 37° C. to a dry solids content of about 40% Thin stillage was weighed into 800 mL beakers and put in a shaking water bath at 98° C. to concentrate the contents by about 4.5-fold (by weight) to produce syrup. To make DDGS samples, the corresponding wet cake and syrup were combined at a 2 to 1 mass ratio (as-is weights), respectively, and mixed well. They were spread onto a metal tray and dried in a 105° C. oven for approximately 3 hours, with occasional mixing, until dry (>90% dry solids).

To test for the bioavailable amino acids, samples of DDGS were incubated with pepsin and pancreatin, and the resulting products were analyzed by HPLC as described in Example 1. The results shown in Table 3 compare the measured amino acid concentration (bioavailable amino acids) from the GOx and GOx+catalase treated DDGS to the control DDGS. As such, for the severely dried DDGS, a 7% increase in bioavailable lysine was observed with GOx treatment, whereas a 16% increase in bioavailable lysine was observed with GOx+catalase treatment. Additionally, there were increases seen in many other amino acids with the addition of both enzymes, including, but not limited to, methionine and arginine. For the GOx only sample, a significant decrease in the bioavailable methionine was observed versus the control, due presumably to the production of hydrogen peroxide by GOx. The addition of catalase was able to covert this hydrogen peroxide to oxygen, thereby avoiding damage to methionine.

TABLE 2

Bioavailable amino acids in enzyme treated samples versus control

| Amino acid | Treatment | | |
| --- | --- | --- | --- |
| | Control | GOx | GOx + Cat |
| Asp | -1- | 1.005 | 1.021 |
| Glu | -1- | 1.009 | 1.105 |
| Ser | -1- | 0.990 | 0.998 |
| His | -1- | 0.992 | 1.026 |
| Gly | -1- | 1.000 | 1.043 |
| Thr | -1- | 0.984 | 1.002 |
| Arg | -1- | 1.131 | 1.160 |
| Ala | -1- | 1.000 | 1.017 |
| Tyr | -1- | 0.991 | 1.001 |
| Cys | -1- | 0.956 | 0.998 |
| Val | -1- | 0.988 | 0.999 |
| Met | -1- | 0.780 | 1.069 |
| Phe | -1- | 0.991 | 1.010 |
| Ile | -1- | 0.976 | 0.994 |
| Leu | -1- | 0.994 | 1.001 |
| Lys | -1- | 1.074 | 1.156 |
| Pro | -1- | 1.073 | 1.060 |

Example 3: HOx+Catalase or GOx+Catalase with Different Drying Conditions

Whole stillage from an industrial scale dry grind ethanol plant was collected and treated with either HOx+catalase or GOx+catalase. Specifically, HOx (pre-commercial sample)

was added at 1% w/w, GOx (OXYGO® HPL5000) was added at 0.25% v/w, and catalase (OPTIMASE® CA) was added at 0.075% v/w with respect the wet weight of stillage. Controls included no enzyme. Following enzyme addition, flasks containing 200 g whole stillage were placed into an incubator at 32° C. with shaking at 2001 rpm, and allowed to incubate for 4 hours. After 4 hours, the whole stillage samples were collected and spun down at 6,000 rpm for 10 minutes. The supernatant (thin stillage) and precipitate (wet cake) were collected. Wet cake was dried at 37° C. until reaching a dry solid content of about 40%. Thin stillage was weighed into 800 mL beakers and put into the shaking water bath at 97° C. to concentrate the contents by about 4.8-fold (by weight), creating syrup.

To make the DDGS samples, wet cake and corresponding syrup were combined at a 2 to 1 mass ratio and mixed well. DDGS was spread onto a metal tray and dried in a 99° C. oven overnight, with occasional mixing, until >95% dry solids. These DDGS were designated "severely dried DDGS." Additionally, a "mildly dried DDGS" sample was created by combining wet cake and syrup at a mass ratio of 2 to 1 (as-is weights), respectively, and drying in a 99° C. oven for 2-3 hours, with occasionally mixing, until dry (>90% dry solids).

To test for the bioavailable amino acids, samples of DDGS were incubated with pepsin and pancreatin, and the resulting products were analyzed by HPLC as described in Example 1. The results shown in Table 2 compare the measured amino acid concentration (bioavailable amino acids) from the HOx+catalase and GOx+catalase-treated DDGS to the control (non-enzyme-treated) DDGS, for both the severely and mildly dried samples. For the severely dried DDGS, a 20% increase in bioavailable lysine was observed with HOx+catalase treatment, whereas a 33% increase in bioavailable lysine was observed with GOx+catalase treatment. Additionally, there were increases seen in many other amino acids with the addition of both enzymes, including, but not limited to, methionine, threonine, and proline. For the mildly dried DDGS, a 20% increase in bioavailable lysine was observed with HOx+catalase treatment, whereas a 23% increase in bioavailable lysine was observed with GOx+catalase treatment. Similarly, increases were seen in many other amino acids, including, but not limited to, glycine and glutamic acid.

TABLE 3

Bioavailable amino acids in enzyme-treated DDGS with different drying conditions

| Amino acid | Severely dried DDGS | | | Mildly dried DDGS | | |
|---|---|---|---|---|---|---|
| | Control | HOx + Cat | GOx + Cat | Control | HOx + Cat | GOx + Cat |
| Asp | -1- | 1.211 | 1.308 | -1- | 1.186 | 1.055 |
| Glu | -1- | 1.113 | 1.282 | -1- | 1.120 | 1.103 |
| Ser | -1- | 1.052 | 1.259 | -1- | 1.022 | 1.021 |
| His | -1- | 1.069 | 1.278 | -1- | 1.009 | 1.043 |
| Gly | -1- | 1.118 | 1.291 | -1- | 1.115 | 1.103 |
| Thr | -1- | 1.067 | 1.271 | -1- | 1.025 | 1.021 |

TABLE 3-continued

Bioavailable amino acids in enzyme-treated DDGS with different drying conditions

| Amino acid | Severely dried DDGS | | | Mildly dried DDGS | | |
|---|---|---|---|---|---|---|
| | Control | HOx + Cat | GOx + Cat | Control | HOx + Cat | GOx + Cat |
| Arg | -1- | 1.041 | 1.194 | -1- | 1.047 | 1.104 |
| Ala | -1- | 1.060 | 1.239 | -1- | 1.027 | 1.030 |
| Tyr | -1- | 1.012 | 1.254 | -1- | 0.982 | 1.025 |
| Cys | -1- | 1.090 | 1.012 | -1- | 1.168 | 0.954 |
| Val | -1- | 1.042 | 1.224 | -1- | 1.026 | 1.024 |
| Met | -1- | 1.294 | 1.408 | -1- | 1.254 | 1.001 |
| Phe | -1- | 0.999 | 1.246 | -1- | 0.973 | 1.029 |
| Ile | -1- | 1.044 | 1.260 | -1- | 1.000 | 1.026 |
| Leu | -1- | 0.969 | 1.128 | -1- | 1.036 | 1.026 |
| Lys | -1- | 1.201 | 1.325 | -1- | 1.197 | 1.234 |
| Pro | -1- | 1.463 | 1.294 | -1- | 1.061 | 1.063 |

What is claimed is:

1. A method for reducing the degradation of amino acids in a dried post-fermentation product from a dry-grind ethanol production facility, comprising contacting a wet post-fermentation product comprising residual reducing sugars and amino acids with an enzyme capable of oxidizing the residual sugars and catalase, thereby reducing degradation of the amino acids via the Maillard reaction during a subsequent heating step to produce a heat-applied post-fermentation product.

2. The method of claim 1, wherein the wet post-fermentation product is fermentation broth.

3. The method of claim 1, wherein the wet post-fermentation product is whole stillage.

4. The method of claim 1, wherein the wet post-fermentation product is thin stillage.

5. The method of claim 1, wherein the heat-applied post-fermentation product is distillers dried grains, distillers dried grains with solutes, condensed distillers solubles or other protein-containing coproducts.

6. The method of claim 1, wherein the amino acids are present in a starch-containing substrate used to produce a mash.

7. The method of claim 6, wherein the substrate comprises corn.

8. The method of claim 1, wherein the amino acids are produced by a fermenting organism used to produce a fermentation broth.

9. The method of claim 8, wherein the fermenting organism is yeast.

10. The method of claim 1, wherein the amino acids are lysines.

11. The method of claim 1, wherein the enzyme capable of oxidizing the residual sugars is glucose oxidase and/or hexose oxidase.

12. The method of claim 1, wherein the reducing sugars comprise glucose.

13. The method of claim 1, wherein the amino acids are lysines and methionines.

* * * * *